United States Patent
He et al.

(10) Patent No.: US 9,488,049 B2
(45) Date of Patent: Nov. 8, 2016

(54) TENSION METER FOR ANCHOR ROD WITH CONSTANT RESISTANCE AND LARGE DEFORMATION

(75) Inventors: Manchao He, Beijing (CN); Zhibiao Guo, Beijing (CN); Jiong Wang, Beijing (CN); Jun Yang, Beijing (CN); Xiaoming Sun, Beijing (CN)

(73) Assignee: China University of Mining & Technology (Beijing), Beijing (CN)

( * ) Notice: Subject to any disclaimer, the term of this patent is extended or adjusted under 35 U.S.C. 154(b) by 243 days.

(21) Appl. No.: 14/126,262

(22) PCT Filed: Jun. 13, 2011

(86) PCT No.: PCT/CN2011/075643
§ 371 (c)(1),
(2), (4) Date: May 30, 2014

(87) PCT Pub. No.: WO2012/171157
PCT Pub. Date: Dec. 20, 2012

(65) Prior Publication Data
US 2014/0318263 A1    Oct. 30, 2014

(51) Int. Cl.
*G01M 5/00* (2006.01)
*E21D 21/02* (2006.01)
*G01L 5/00* (2006.01)

(52) U.S. Cl.
CPC ............ *E21D 21/02* (2013.01); *G01L 5/0038* (2013.01); *G01L 5/0061* (2013.01)

(58) Field of Classification Search
CPC .... G01L 5/0038; G01L 5/0061; E21D 21/02
USPC .................................................. 73/786, 856
See application file for complete search history.

(56) References Cited

U.S. PATENT DOCUMENTS

| | | | | |
|---|---|---|---|---|
| 3,543,569 | A * | 12/1970 | Carter | G01N 3/10 254/29 A |
| 3,978,722 | A | 9/1976 | Glötzl et al. | |
| 4,301,565 | A * | 11/1981 | Weinbaum | E01D 22/00 14/77.1 |
| 4,449,734 | A * | 5/1984 | Cory | B66C 23/80 212/303 |
| 6,848,693 | B2 * | 2/2005 | Schneider | B60S 9/12 280/6.153 |

FOREIGN PATENT DOCUMENTS

| | | |
|---|---|---|
| CN | 2085060 U | 9/1991 |
| CN | 2189739 Y | 2/1995 |
| CN | 2411471 Y | 12/2000 |
| CN | 2687643 Y | 3/2005 |
| CN | 101858225 A | 10/2010 |

OTHER PUBLICATIONS

International Search Report from PCT/CN2011/075643 Aug. 18, 2011 (2 pages).

* cited by examiner

*Primary Examiner* — Lisa Caputo
*Assistant Examiner* — Roger Hernandez-Prewit
(74) *Attorney, Agent, or Firm* — Calfee, Halter & Griswold, LLP

(57) ABSTRACT

A tension meter of an anchor rod with constant resistance and large deformation comprises a pull rod and a hollow jack. The meter further includes: a rotation device for controlling the rotation angle of the hollow jack; a lifter for adjusting the height of the hollow jack and the rotation device; a first hydraulic pump for driving the hollow jack, wherein the hollow jack is fixed on the rotation device mounted on the lifter. The meter has a large measurement range and a high load capacity.

5 Claims, 3 Drawing Sheets

TENSION METER FOR ANCHOR ROD WITH CONSTANT RESISTANCE AND LARGE DEFORMATION

CROSS-REFERENCE TO RELATED APPLICATION

This application is the U.S. national phase entry of PCT/CN2011/075643, with an international filing date of 13 Jun. 2011, the entire disclosure of which is fully incorporated herein by reference.

TECHNICAL FIELD

The disclosure relates to a tension meter for anchor rod and, more particularly, to a tension meter for anchor rod with constant resistance and large deformation, which has a large extension rate.

BACKGROUND ART

In mining roadway or tunnel support, the anchor rod is the most widely-used and large-consumed support equipment. With the continuous deepening of mining depth, surround rocks of roadway always have a characteristic of large deformation of soft rock. The conventional anchor rod has a low extension rate, and is not capable of adapting to the characteristic of large deformation of roadway surround rock, which may cause the supporting failure of the anchor rod, and generate accidents such as tunnel roof falling, overbreak and so on. To solve the problem above, the Chinese patent application No. 201010196197.2 discloses an anchor rod with constant resistance and large deformation, which has a large extension rate, the extension of which can reach to 600 mm to 800 mm. However, the conventional tension meter of the anchor rod cannot satisfy the testing requirements of this kind of anchor rod.

SUMMARY OF THE INVENTION

An objective of the disclosure is to provide a tension meter for anchor rod with constant resistance and large deformation, to solve the problem that the conventional tension meter of anchor rod cannot meet the requirements of on-site testing an anchor rod with constant resistance and large deformation due to a small measurement range, a low load capacity and being incapable of circular pressurization.

To solve the problems above, one aspect of the disclosure provides a tension meter for anchor rod with constant resistance and large deformation, comprising a pull rod and a hollow jack for tensioning an anchor rod, wherein the tension meter further comprises a rotation device for controlling the rotation angle of the hollow jack; a lifter for controlling a height of the hollow jack and a height of the rotation device; and a first hydraulic pump for driving the hollow jack to operate; wherein the hollow jack is fixed on the rotation device mounted on the lifter.

According to a preferred embodiment of the tension meter for anchor rod with constant resistance and large deformation, the rotation device comprises a container body, a container cover and a first jack, one edge of the container cover is hinged to an edge of the container body, the hollow jack is fixed on the container cover, one end of the first jack is hinged under the container cover, and the other end of the first jack is hinged in the container body to control the rotation of the container cover, and the first jack is connected to a second hydraulic pump via a hydraulic pipe.

According to a preferred embodiment of the tension meter for anchor rod with constant resistance and large deformation, the lifter is a lifting platform.

According to a preferred embodiment of the tension meter for anchor rod with constant resistance and large deformation, the tension meter further comprises a moving device, and the lifter is disposed on the moving device.

According to a preferred embodiment of the tension meter for anchor rod with constant resistance and large deformation, the second hydraulic pump is a manual hydraulic pump.

According to a preferred embodiment of the tension meter for anchor rod with constant resistance and large deformation, a driving mechanism of the lifting platform is a second jack, the second jack is connected to a third hydraulic pump via a hydraulic pipe.

According to a preferred embodiment of the tension meter for anchor rod with constant resistance and large deformation, the first hydraulic pump is an air driven hydraulic pump.

According to a preferred embodiment of the tension meter for anchor rod with constant resistance and large deformation, the third hydraulic pump is a manual hydraulic pump.

According to a preferred embodiment of the tension meter for anchor rod with constant resistance and large deformation, the tension meter further comprises a parameter calculating device, which is used to obtain a pressure intensity in the hydraulic pipe and calculate a tension force and a tension measuring range of the hollow jack.

Based on the technical solutions of the disclosure mentioned above, the tension meter for anchor rod with constant resistance and large deformation disclosed has at least one of the following advantages of having a large measurement range, having a high load capacity, being easy in operation and being capable of reducing labor intensity. In a preferred embodiment, a reciprocating air driven hydraulic pump is used to drive the hollow jack, wherein the reciprocating air driven hydraulic pump uses pressed air as the power source, is reliable in operation, is easy in maintenance and has a low noise.

DETAILED DESCRIPTION OF THE PREFERRED EMBODIMENTS

Hereinafter, the embodiments are described with reference to the accompanying drawings.

Figure 1:
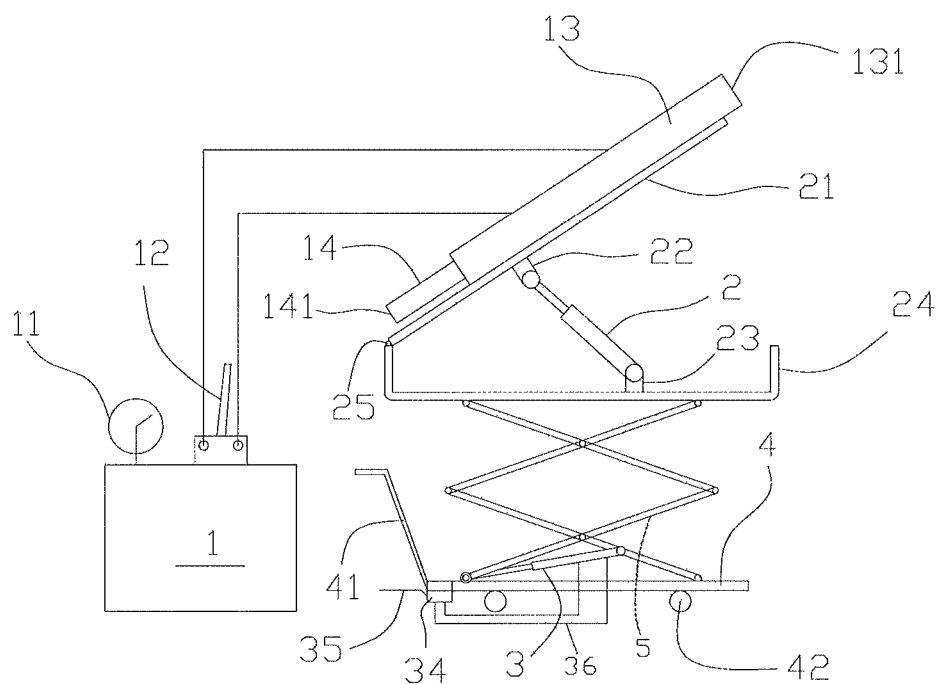
FIG. 1 is a structural diagram showing a main body of a preferred embodiment of the disclosure.

FIG. 1 is a structural schematic diagram showing the main body of an embodiment of the disclosure. As shown in FIG. 1, in an embodiment of the disclosure, there are a hollow jack 13 for tensioning an anchor rod, a rotation device for controlling a rotating angle of the hollow jack 13, a lifter 5 for controlling a height of the hollow jack 13 and a height of the rotation device, an air-driven hydraulic pump 1 for driving the hollow jack 13 to operate, and a flat trolley 4 for moving the lifter 5. Since the hollow jack 13 is well known, the details thereof will not be illustrated herein for concise purpose.

As shown in FIG. 1, the hollow jack 13 is connected to a reversing valve 12 of the hydraulic pump 1 via a hydraulic pipe (not shown). In a preferred embodiment, the hydraulic pump 1 is an air hydraulic pump for achieving a wind-driven circular pressurization and a large measurement range, so as to satisfy the requirement of parameter test when the anchor rod with constant resistance and large deformation has a large extension rate. The hydraulic pump 1 is disposed with a pressure meter 11 for showing an output pressure. By the observation of the pressure meter 11, the pressure intensity inside the hollow jack 13 is obtained. By combination with an area parameter of a piston inside the hollow jack, a tension force of the hollow jack 13 may be calculated.

In an embodiment, the rotation device may comprise a container body 24, a container cover 21 and a jack 2. An edge of the container cover 21 is hinged to an edge of the container body 24 via a rotation shaft 25. The hollow jack 13 is fixed on the container cover 21. A hinge seat 22 is arranged under the container cover 21. A hinge seat 23 is arranged on a bottom plate of the container body 24. One end of the jack 2 is hinged to the hinge seat 22, and the other end of the jack 2 is hinged to the hinge seat 23. In such a way, when a piston rod of the jack 2 is protruded out, the piston rod pushes the container cover 21 to rotate about the rotating shaft 25, so as to control the hollow jack 13 to form different angles with respect to a horizontal surface. The jack 2 is connected to a hydraulic pump (for simplifying FIG. 1, the hydraulic pump and the connected hydraulic pipe are not shown in FIG. 1) via a hydraulic pipe. The hydraulic pump is preferably disposed at the same position as a manual hydraulic pump 34 so as to facilitate the operator to operate at the position where the operator pushes the flat trolley 4, so as to adjust the jack 2. Preferably, the hydraulic pump driving the jack 2 may be a manual hydraulic pump, which is convenient for adjusting the rotating angle of the container cover 21 according to the requirements, so as to precisely control a bottom end 131 of an oil cylinder of the hollow jack 13 to direct to different angles.

In an embodiment, the lifter 5 may be a scissor type lifting platform. The scissor type lifting platform is disposed on the flat trolley 4. The flat trolley 4 is disposed with wheels 42 to facilitate moving. The scissor type lifting platform is driven by the jack 3 to move up and down. The hydraulic pump for driving the jack 3 to move is a manual hydraulic pump 34. The jack 3 is connected to the manual hydraulic pump 34 via a hydraulic pipe 36. The manual hydraulic pump 34 is disposed with a handle 35, by which the manual hydraulic pump 34 and the jack 3 and thereby the height of the lifting platform are controlled.

In a preferred embodiment, there is a parameter calculating device (not shown). The parameter calculating device includes a flow meter, a data calculating module, a storage module and a display module disposed at the hydraulic pipe between the hollow jack 13 and the hydraulic pump 1. The flow meter is used to obtain the pressure intensity in the hydraulic pipe and at the same time obtain the quantity of the hydraulic oil that flows into the hollow jack 13 in unit time. The data calculating module records the quantity and pressure of the hydraulic oil that flows into the hollow jack 13 after the piston rod 14 begin to move, calculates the tension force and tension measurement range of the hollow jack 13 according to the area of the piston rod of the hollow jack 13, and then outputs the calculated results to the storage module and the display module. The display module may be used to visually display characteristic parameters of the tested anchor rod with constant resistance and large deformation.

The storage module is used to store the characteristic parameters of the anchor rod with constant resistance and large deformation for invocation.

Figure 3:
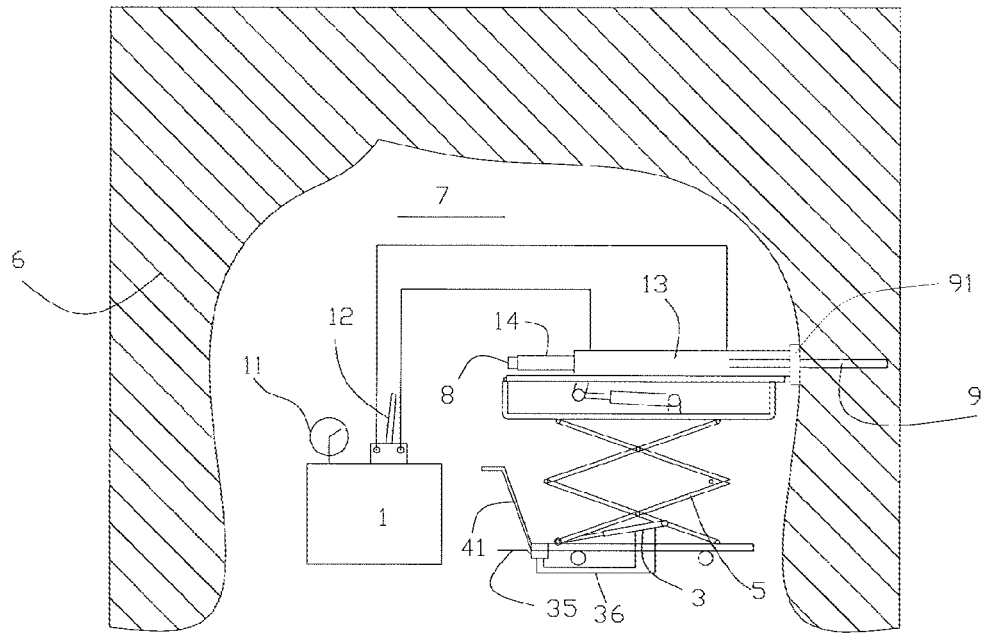
FIG. 3 to FIG. 5 are reference schematic diagrams showing different application states of a preferred embodiment of the disclosure.
Figure 4:
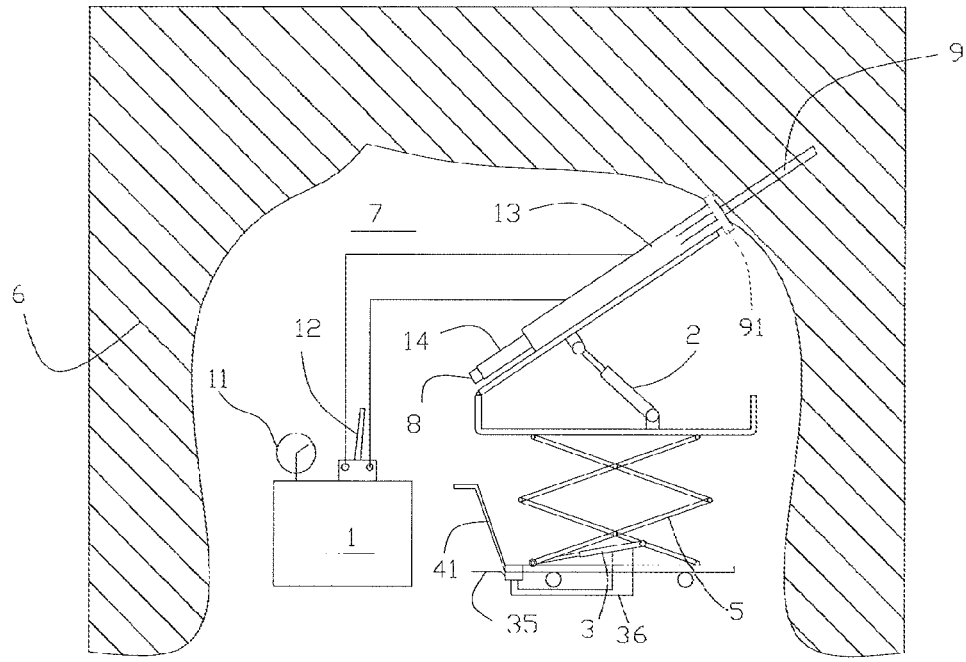
Figure 5:
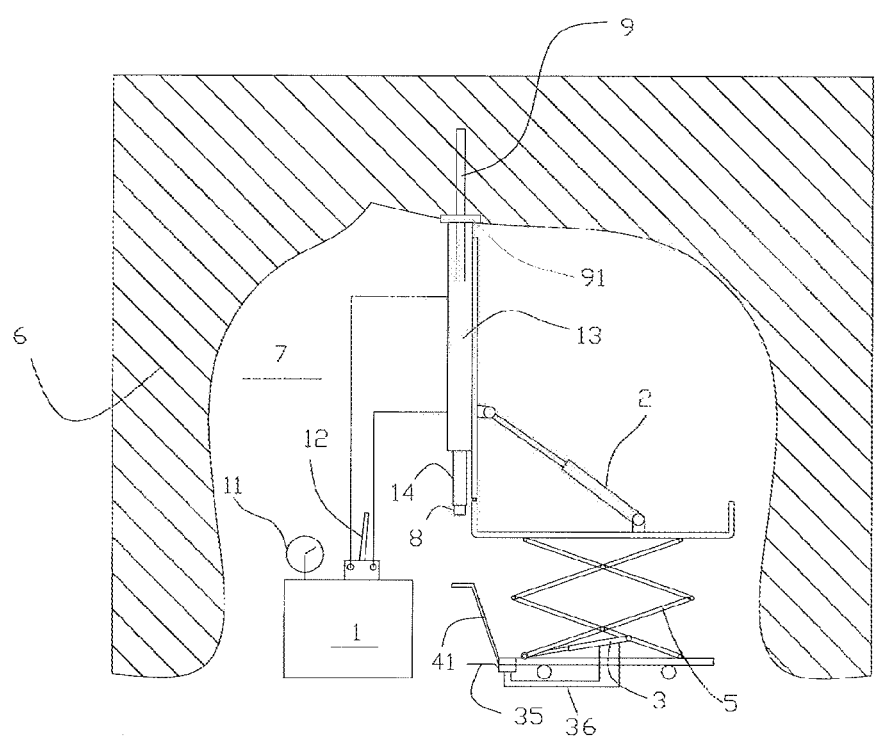

To further illustrate embodiments of the disclosure, please refer to FIG. 3 to FIG. 5. FIG. 3 to FIG. 5 are schematic diagrams showing references states for testing anchor rods 9 with constant resistance and large deformation in different positions of the roadway 7. The surrounding rocks 6 are dug to form the roadway 7. To prevent the roof falling and overbreak of the roadway 7, a plurality of anchor rods 9 with constant resistance and large deformation are disposed in the surrounding rock 6.

Figure 2:
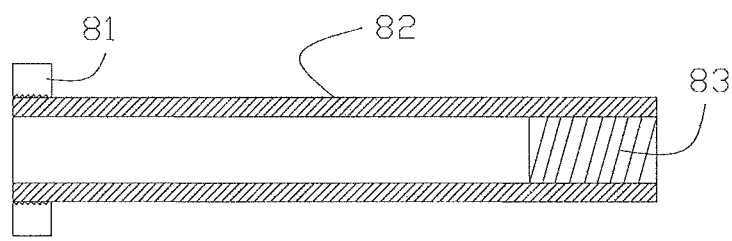
FIG. 2 is a structural diagram showing a pull rod in a preferred embodiment of the disclosure.

When testing the anchor rods 9 with constant resistance and large deformation in different positions of the roadway 7, since the end of the anchor rod 9 that is exposed out of the surrounding rock 6 is relatively short, a pull rod 8 is needed for assistance. The pull rod 8 used in an embodiment is shown in FIG. 2, and includes a rod body 82, a nut 81 and an internal thread 83. An end of the rod body 82 is disposed with an external thread to connect with the nut 81, and the other end of the rod body 82 is disposed with an internal thread 83 to connect with the anchor rod 9 with constant resistance and large deformation.

When testing the anchor rod 9 with constant resistance and large deformation in a horizontal position according to an embodiment, as shown in FIG. 3, the user pushes a handle 41 of the flat trolley 4, moves the lifting platform and the hollow jack 13 and so on to the position of the anchor rod 9 with constant resistance and large deformation to be tested, operates a handle 35 such that the hollow jack 13 is lifted in parallel so as to arrive the position of the tested anchor rod 9 with constant resistance and large deformation, makes the external thread of the anchor rod 9 with constant resistance and large deformation connect to the internal thread of the rod body 82 extended from the bottom end of the hollow piston rod 14, and extends the other end of the rod body 82 out of the top end 141 of the hollow piston rod 14. Further, the bottom end 131 of the oil hydraulic cylinder is pressed against a tray 91 of the anchor rod 9 with constant resistance and large deformation to be tested. Then, a nut 81 is assembled at the other end of the rod body 82, and the diameter of the nut 81 is larger than the hole diameter of the piston rod 14. Thereafter, the hydraulic pump 1 and the reversing valve 12 are opened to output hydraulic oil to the hollow jack 13, so as to make the hollow piston rod 14 move towards the bottom end, thereby exerting a tension force to the anchor rod 9 with constant resistance and large deformation via the pull rod 8, and at the meantime, the testing parameters are recorded and calculated.

As shown in FIG. 4 and FIG. 5, when testing the lean or vertical anchor rod 9 with constant resistance and large deformation, it is needed to operate the handle 35 on the flat trolley 4 to control the hydraulic pump 34, thereby controlling the jack 3 so as to adjust the height of the lifting platform, and to operate another handle to control the corresponding hydraulic pump, thereby controlling the jack 2 so as to adjust the rotating angle of the hollow jack 13 and make the bottom 131 of the oil cylinder press against a tray 91 of the anchor rod 9 with constant resistance and large deformation to be tested. Other operations are the same as those above.

To sum up, in the disclosure, by the hollow jack whose direction and height are adjustable and the circular pressurization of the air driven hydraulic pump, the tension meter for anchor rod with constant resistance and large deformation in the disclosure has at least one of the following advantages: having a large measurement range, a high load capacity, and a wind-driven circular pressurization, and solves the problem that the conventional tension meter of anchor rod cannot meet the requirements of on-site testing the anchor rod with constant resistance and large deformation.

The disclosure can be applied in various embodiments without departing from the spirit or principle of the disclosure. Although the disclosure has been described as above in reference to several typical embodiments, in all aspects, they are just illustrative and exemplary rather than restrictive. Therefore, the present disclosure tends to involve all the modifications falling within the protection scope and equivalents.

What is claimed is:

1. A tension meter for anchor rod with constant resistance and large deformation, comprising a pull rod, a hollow jack for tensioning an anchor rod, a rotation device for controlling a rotation angle of the hollow jack, a scissor type lifting platform for controlling a height of the hollow jack and a height of the rotation device, and a first hydraulic pump for driving the hollow jack to operate; wherein the hollow jack is fixed on the rotation device mounted on the scissor type lifting platform;

wherein the rotation device comprises a container body, a container cover and a first jack; one edge of the container cover is hinged to an edge of the container body, the hollow jack is fixed on the container cover, one end of the first jack is hinged under the container cover, and the other end of the first jack is hinged in the container body to control the rotation of the container cover.

2. The tension meter for anchor rod with constant resistance and large deformation according to claim 1, wherein the tension meter further comprises a moving device, the scissor type lifting platform is disposed on the moving device.

3. The tension meter for anchor rod with constant resistance and large deformation according to claim 1, wherein a driving mechanism of the scissor type lifting platform is a second jack, and the second jack is connected to a second hydraulic pump via a hydraulic pipe.

4. The tension meter for anchor rod with constant resistance and large deformation according to claim 3, wherein the second hydraulic pump is a manual hydraulic pump.

5. The tension meter for anchor rod with constant resistance and large deformation according to claim 1, wherein the first hydraulic pump is an air driven hydraulic pump.

\* \* \* \* \*